Patented Sept. 15, 1931

1,823,847

UNITED STATES PATENT OFFICE

GERHARD BALLE, HANS LANGE, AND KARL OST, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

FORMIC ACID ESTER OF DIETHYL ETHER OF CELLULOSE AND THE PROCESS OF PREPARING THE SAME

No Drawing. Application filed October 14, 1929, Serial No. 399,691, and in Germany October 22, 1928.

This invention relates to formic acid esters from alkyl ethers of celluloses containing free hydroxy groups and process of preparing them.

We have found that formic acid esters can be made by dissolving an alkyl ether of celluloses containing free hydroxy groups in an excess of formic acid, stirring at ordinary or raised temperature and then causing the solution while stirring to run into water. The product thus precipitated is an ether formate of the cellulose. Instead of pure formic acid, concentrated aqueous solutions thereof may be used, in which case the formylation occurs more slowly and more incompletely. The ether formates contain about 1–2½ mol. of alkyl and 2–0.1 mol. of formic acid per 1 mol. of $C_6H_{10}O_5$, a specific instance being 2 mol. of ethoxyl and 0.3 mol. of formic acid. The products are soluble in organic solvents. The higher the content of formic acid the more marked is the solubility in typical ester solvents.

The following examples serve to illustrate the invention, but they are not intended to limit it thereto:—

1. 200 grams of diethylcellulose are dissolved in 800 grams of formic acid of 90 per cent. strength and the solution stirred during 6–7 hours at ordinary temperature. The solution is then poured into water and the deposited product is washed with water until neutral and then dried. The ethylcellulose formate thus obtained contains about 39–40 per cent. of $OC_2H_5$ and 7–8 per cent. of formic acid. This formate is entirely stable and waterproof.

2. 100 grams of water-soluble methyl cellulose are dissolved in 900 grams of formic acid of 90 per cent. strength and the solution thus obtained is thoroughly stirred for about 24–30 hours. The solution is then poured into water. The precipitated methyl cellulose formate is washed and dried. It is insoluble in water, but soluble in organic solvents.

3. 200 grams of ethyl benzylcellulose containing about 1.6 mol. of $OC_2H_5$ and 0.5 mol. of $OCH_2C_6H_5$ per one mol. of $C_6H_{10}O_5$ are dissolved at about 20° C. in 600 grams of formic acid of about 90 per cent. strength and after having been stirred for 10 hours poured into water. The precipitated ethylbenzylcellulose formate is washed until neutral and dried. In this case substitution in the cellulose is nearly complete. The product is soluble in methylene chloride but insoluble in water.

We claim:

1. Process of preparing formic acid ester of diethyl ether of cellulose, which consists in treating diethyl ether of cellulose containing free hydroxy groups with formic acid of 90 per cent. strength.

2. As new products, formic acid esters of alkyl ethers of celluloses containing per one mol. of $C_6H_{10}O_5$ 1–2½ mol. of alkyl and 2–0.1 mol. of formic acid.

3. As a new product, formic acid ester of diethyl ether of cellulose containing per one mol. of $C_6H_{10}O_5$ 2 mol. of ethoxyl and 0.3 mol. of formic acid.

4. Process of preparing formic acid esters of alkyl ethers of celluloses, which consists in treating these alkyl ethers of celluloses containing free hydroxy groups with formic acid of 90 per cent. strength.

In testimony whereof, we affix our signatures.

GERHARD BALLE.
HANS LANGE.
KARL OST.